United States Patent
Clark et al.

(10) Patent No.: US 8,055,502 B2
(45) Date of Patent: Nov. 8, 2011

(54) VOICE DIALING USING A REJECTION REFERENCE

(75) Inventors: Jason W. Clark, Grosse Pointe Woods, MI (US); Rathinavelu Chengalvarayan, Naperville, IL (US); Timothy J. Grost, Clarkston, MI (US); Dana B. Fecher, Farmington Hills, MI (US); Jeremy M. Spaulding, Birmingham, MI (US)

(73) Assignee: General Motors LLC, Detroit, MI (US)

( * ) Notice: Subject to any disclaimer, the term of this patent is extended or adjusted under 35 U.S.C. 154(b) by 746 days.

(21) Appl. No.: 11/563,809

(22) Filed: Nov. 28, 2006

(65) Prior Publication Data
US 2008/0126091 A1    May 29, 2008

(51) Int. Cl.
*G10L 21/00* (2006.01)
(52) U.S. Cl. ............... 704/270; 704/243; 704/244
(58) Field of Classification Search ............ 704/251, 704/270, 275, 231, 235, 243, 244, 250, 270.1
See application file for complete search history.

(56) References Cited

U.S. PATENT DOCUMENTS

| | | | |
|---|---|---|---|
| 4,870,686 A * | 9/1989 | Gerson et al. | 704/234 |
| 5,303,299 A * | 4/1994 | Hunt et al. | 379/88.01 |
| 7,200,555 B1 * | 4/2007 | Ballard et al. | 704/235 |
| 2003/0023439 A1 * | 1/2003 | Ciurpita et al. | 704/246 |
| 2003/0154075 A1 * | 8/2003 | Schalk et al. | 704/231 |
| 2005/0055205 A1 * | 3/2005 | Jersak et al. | 704/233 |
| 2005/0177376 A1 * | 8/2005 | Cooper et al. | 704/277 |
| 2008/0262831 A1 * | 10/2008 | Liedtke | 704/9 |

FOREIGN PATENT DOCUMENTS

WO    WO 2005122142 A1 *    12/2005

OTHER PUBLICATIONS

Horton, Beginning C: From Novice to Professional, Oct. 19, 2006, Apress, Fourth Edition, p. 210.*

* cited by examiner

*Primary Examiner* — Huyen X. Vo
(74) *Attorney, Agent, or Firm* — Anthony L. Simon; Reising Ethington P.C.

(57) ABSTRACT

A voice dialing method includes the steps of receiving an utterance from a user, decoding the utterance to identify a recognition result for the utterance, and communicating to the user the recognition result. If an indication is received from the user that the communicated recognition result is incorrect, then it is added to a rejection reference. Then, when the user repeats the misunderstood utterance, the rejection reference can be used to eliminate the incorrect recognition result as a potential subsequent recognition result. The method can be used for single or multiple digits or digit strings.

10 Claims, 6 Drawing Sheets

| 300 |||||
|---|---|---|---|
| STEP(s) | WHO | COMMUNICATION | NOTES |
| 305/310 | User: | "313" | Decoded as N-best results 312, 314, 313, …N |
| 315 | System: | 312 | First best result is returned by system to user |
| 320/325 | User: | "Correction" | 312 is added to a rejection reference |
| 330 | System: | Ok, let's try again | Prompt |
| 335/340 | User: | "313" | Decoded as N-best results 312, 314, 313, …N |
| 345/350 | System: | 314 | X-ref with rejection reference ~~312~~, 314, 313, …N<br>1$^{st}$ best result eliminated, 2$^{nd}$ best result returned |
| 355/360 | User: | "Correction" | 314 is added to the rejection reference |
| 365 | System: | Ok, let's try again | Prompt |
| 370/375 | User: | "313" | Decoded as N-best results 312, 314, 313, …N |
| 380/385 | System: | 313 | X-ref with rejection reference ~~312~~, ~~314~~, 313, …N<br>1$^{st}$/2$^{nd}$ best results eliminated, 3$^{rd}$ best result returned |
| 390 | User: | "667" | User accepts 313 result by uttering next digit string |

FIG. 3

| | | | 400 | |
|---|---|---|---|---|
| STEP(s) | WHO | COMMUNICATION | NOTES | |
| 405/410 | User: | "313" <pause> "667" | User utters two digit strings before system responds<br>313 decoded as N-best results 312, 314, 313, ...N<br>667 decoded as N-best results 667, 767, 677, ...N | |
| 415 | System: | 312 | First best result is returned by system to user | |
| | System: | 667 | First best result is returned by system to user | |
| 420/425 | User: | "Correction" | 667 is added to a multi-position rejection reference | |
| | | | Position One | Position Two |
| | | | *** | 667 |
| 430 | System: | 312 | Prompt | |
| 435/440 | User: | "Correction" | Multi-position rejection reference is revised | |
| | | | Position One | Position Two |
| | | | 312 | ~~667~~ |
| 445 | System: | Ok, let's try again | Prompt | |
| 450/455 | User: | "313" | Decoded as N-best results 312, 314, 313, ...N | |
| 460/465 | System: | 313 | X-ref with rejection reference ~~312~~, 313, 314, ...N<br>1st best result eliminated, 2nd best result returned | |
| 470/475 | User: | "667" | User accepts 313 result by uttering next digit string<br>Decoded as N-best results 667, 767, 677, ...N | |
| 480/485 | System: | 667 | X-ref with rejection reference, but 667 not precluded because cleared from rejection reference<br>First best result returned | |

FIG. 4

| 500 |||||||||||
|---|---|---|---|---|---|---|---|---|---|---|
| STEP(s) | WHO | COMMUNICATION | NOTES |||||||||
| 505/510 | User: | "313" <pause> "555" | User utters two digit strings before system responds<br>  First string covers digit positions 1, 2, 3<br>    Decoded as N-best results 318, 313, 314, …N<br>  Second string covers digit positions 4, 5, 6<br>    Decoded as N-best results 559, 555, 595, …N |||||||||
| 515 | System: | 318 | First best result is returned by system to user |||||||||
|  | System: | 559 | First best result is returned by system to user |||||||||
| 520/525 | User: | "Correction" | User wants to correct 559<br>559 added to multi-digit-position rejection reference |||||||||
|  |  |  | 1 | 2 | 3 | 4 | 5 | 6 | 7 | 8 | 9 | 10 |
|  |  |  | * | * | * | 5 | 5 | 9 | * | * | * | * |
| 530 | System: | 318 | Prompt |||||||||
| 535/540 | User: | "555" | User doesn't realize yet that 318 is incorrect<br>Decoded as N-best results 559, 555, 595, …N |||||||||
| 545/550 | System: | 555 | X-ref with rejection reference ~~559~~, 555, 595, …N<br>1st best result eliminated, 2nd best result returned |||||||||

FIG. 5A

| 500 Continued ||||||||||||||
| --- | --- | --- | --- | --- | --- | --- | --- | --- | --- | --- | --- | --- | --- |
| 555/560 | User: | "Correction" | User realizes 318 is incorrect<br>555 added to rejection reference ||||||||||||
| | | | 1 | 2 | 3 | 4 | 5 | 6 | 7 | 8 | 9 | 10 |
| | | | * | * | * | 5 | 5 | 9 | * | * | * | * |
| | | | * | * | * | 5 | 5 | 5 | * | * | * | * |
| 565 | System: | 318 | Prompt |||||||||||
| 570/575 | User: | "Correction" | 318 is added to rejection reference, and 555 cleared ||||||||||||
| | | | 1 | 2 | 3 | 4 | 5 | 6 | 7 | 8 | 9 | 10 |
| | | | * | * | * | 5 | 5 | 9 | * | * | * | * |
| | | | * | * | * | 5 | 5 | 5 | * | * | * | * |
| | | | 3 | 1 | 8 | * | * | * | * | * | * | * |
| 580 | System: | Ok, let's try again | Prompt |||||||||||
| 585/590 | User: | "313555" | Decoded as N-best results 313555, 313559, …N |||||||||||
| 595 | System: | 313555 | First best result returned |||||||||||
| 600/605 | User: | "5594" | User accepts 313555 result by uttering next digit string covering digit positions 7, 8, 9, 10<br>Decoded as N-best results 5594, 5554, …N |||||||||||
| 610 | System: | 5594 | First best result returned |||||||||||

FIG. 5B

VOICE DIALING USING A REJECTION REFERENCE

TECHNICAL FIELD

This invention relates to automated speech recognition (ASR) and, more particularly, to voice dialing using ASR.

BACKGROUND OF THE INVENTION

ASR technologies enable microphone-equipped computing devices to interpret speech and thereby provide an alternative to conventional human-to-computer input devices such as keyboards or telephone keypads. For example, many telecommunications devices are equipped with hands-free voice dialing features to initiate a telecommunication session. Such voice dialing features are enabled by ASR technology to detect the presence of discrete speech such as a command like CALL, and nametags like HOME or OFFICE. Moreover, a user may use ASR-enabled voice dialing to initiate a telephone call by speaking a command like DIAL followed by a plurality of digits constituting a complete a telephone number.

But with such discrete digit dialing, ASR systems typically repeat every single digit immediately after recognizing the user's utterance of each digit. Although this approach may be reliable in a high noise environment, it requires a significant amount of time to enter a lengthy string of digits. Moreover, this single digit verification process annoys users when a digit utterance is incorrectly recognized. This is because users may forget a subsequent digit to be uttered when stopping to say a command like CLEAR, repeating the misrecognized digit, and then listening to a system verification before resuming with the rest of the digits.

To address this inconvenience, some ASR-enabled voice dialing systems allow a user to initiate a call by speaking lengthy telephone numbers in predefined groups of multiple-digit strings of any length, one at a time with pauses therebetween. For example, a user can dial the telephone number 1-313-667-8888 by uttering ONE-THREE-ONE-THREE <pause> <wait for verification and correct if necessary> SIX-SIX-SEVEN <pause> <wait for verification and correct if necessary> EIGHT-EIGHT-EIGHT-EIGHT (or EIGHTY-EIGHT EIGHTY-EIGHT).

However, these variable length dialing schemes can also have problems. For example, these voice dialing systems normally require users to utter only one digit string at a time and require the user to correct that one string before uttering any subsequent strings. In other words, such systems do not allow a user to speak a telephone number in a customary, natural manner. For example, if a user utters multiple digit strings including a first correctly recognized string, then an incorrectly recognized string, and a subsequent correctly recognized string, the user would have to clear the entire number recognized thus far and start all over from the beginning. In fact, such systems do not allow a user to enter multiple strings and then back up and skip over a correctly recognized string to correct an incorrectly recognized string.

SUMMARY OF THE INVENTION

According to one aspect of the present invention, there is provided a voice dialing method, comprising the steps of:
(a) receiving an utterance from a user;
(b) determining a recognition result for the utterance;
(c) communicating the recognition result to the user;
(d) receiving from the user an indication of whether the communicated recognition result is incorrect; and
(e) if incorrect, then populating a rejection reference with the incorrect recognition result.

The voice dialing method may also include one or more of the following additional steps:
(f) prompting the user to replace the incorrect recognition result;
(g) receiving a correction utterance from the user to replace the incorrect recognition result;
(h) determining a corrected recognition result for the correction utterance;
(i) comparing the corrected recognition result to the rejection reference; and
(j) communicating to the user a corrected recognition result that is not precluded by the rejection reference.

BRIEF DESCRIPTION OF THE DRAWINGS

Preferred exemplary embodiments of the invention will hereinafter be described in conjunction with the appended drawings, wherein like designations denote like elements, and wherein:

FIG. 3 is a table illustrating an embodiment of an exemplary voice dialing method that can be performed using the telematics system and ASR architecture of FIGS. 1 and 2;

FIG. 4 is a table illustrating another embodiment of an exemplary voice dialing method that can be performed using the telematics system and ASR architecture of FIGS. 1 and 2; and FIGS. 5A and 5B are a table illustrating a further embodiment of an exemplary voice dialing method that can be performed using the telematics system and ASR architecture of FIGS. 1 and 2.

DETAILED DESCRIPTION OF THE PREFERRED EMBODIMENTS

Figure 1:
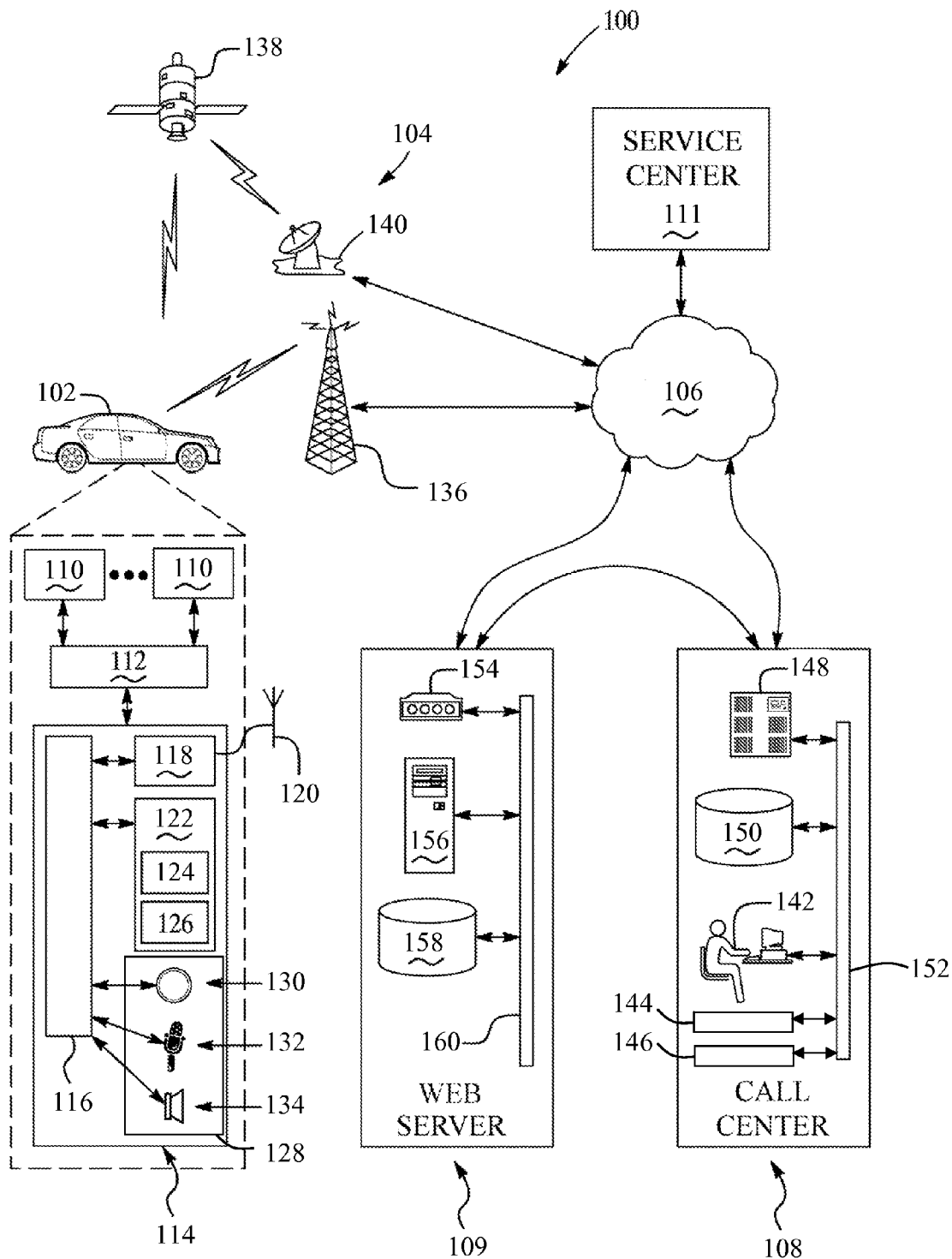
FIG. 1 is a block diagram depicting an example of a telematics system that can be used to implement exemplary methods of voice dialing.

An exemplary operating environment is illustrated in FIG. 1, and can be used to implement a presently disclosed method of voice dialing using a rejection reference to increase recognition accuracy. The method can be carried out using any suitable ASR and/or telematics system and, preferably, is carried out in conjunction with a vehicle telematics system such as system 100. Those skilled in the art will appreciate that the overall architecture, setup, operation, and individual components of the system 100 are generally known in the art. Thus, the following system description simply provides a brief overview of one such exemplary telematics system, but other systems and components not shown here could also support the presently disclosed method.

The exemplary telematics system 100 includes a motor vehicle 102 for carrying one or more occupants or users, and a wireless communication system 104 for providing wireless communication to and from the vehicle 102. Also, the system 100 can include a second communications system 106 for communicating the wireless communication system 104 with a call center 108 of the system 100 that provides services to the vehicle 102. Further, the system 100 can include a web server 109 in communication with the vehicle 102 and/or the call center 108 for providing Internet services thereto. Finally, the system 100 can include a vehicle service center 111 in communication with, and providing maintenance services to, the vehicle 102.

The system 100 generally facilitates one or more suitable services for vehicle occupants such as vehicle navigation, turn-by-turn driving directions, telephony, infotainment, emergency services, vehicle diagnostics, vehicle system updates, and automatic speech recognition. For this purpose, the system 100 processes data and instructions as well as facilitates wireless voice and data transfer between hardware located on the vehicle 102 and hardware in the remote call center 108. For example, the system 100 enables vehicle occupants to initiate voice communication with the call center 108 or the service center 111. Also, the system 100 enables electronic communication between the vehicle 102 and the web server 109 for various purposes such as transmitting and/or receiving data such as updated voice messages, email, news, Internet webpage content, or the like.

Motor Vehicle

The motor vehicle 102 is depicted in the illustrated embodiment as a passenger car, and it will be appreciated that any other vehicles including motorcycles, marine vessels, aircraft, recreational vehicles, and other automobiles such as vans, trucks, or the like, can be used without departing from the scope of the invention. Various electronic modules can be located on the vehicle 102 and include one or more vehicle system modules (VSMs) 110, an on-board vehicle communication bus 112, and one or more vehicle telematics units 114 connected by the bus 112 to the VSMs 110.

VSMs

The VSMs 110 facilitate any suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any software, electronic, or electromechanical subsystems, and related sensors or other components throughout the vehicle with which the telematics unit 114 interacts. In a specific example, if the call center 108 sends a signal to the vehicle 102 to unlock the vehicle doors, then the telematics unit 114 instructs an electromechanical door lock VSM to unlock the doors.

Vehicle Communication Bus

The vehicle communication bus 112 facilitates interactions among various vehicle systems such as the VSMs 110 and/or the telematics unit 114 and uses any suitable network communication configuration whether wired or wireless. Suitable interfaces can be interposed between the bus 112 and the various vehicle systems. As used herein, the term interface broadly means any suitable form of electronic device or adapter, or even a software module or adapter, to enable one piece of equipment to communicate with or control another piece of equipment. A few examples of buses include a Controller Area Network (CAN), Media Oriented System Transport (MOST), Local Interconnect Network (LIN), Ethernet (10 baseT, 100 baseT), Local Area Network (LAN), ISO Standard 9141, ISO Standard 11898 for high-speed applications, ISO Standard 11519 for lower speed applications, SAE Standard J1850 for high-speed and lower speed applications, and/or a wireless area network.

Vehicle Telematics Unit

The vehicle telematics unit 114 facilitates communication and other services between the vehicle 102 or occupants thereof, and various remote locations including the call center 108, web server 109, and/or service center 111. The telematics unit 114 interfaces with the various VSMs 110 via the vehicle communication bus 112. The telematics unit 114 can be implemented in any suitable configuration, but can include a processor 116, a communications device 118 for wireless communication to and from the vehicle 102 via one or more antennas 120, a memory 122 to store computer programs 124 and/or one or more databases 126, and a user interface 128. The telematics unit 114 also includes any suitable interface(s) for intercommunicating the aforementioned devices.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSMs 110 are shown separate from the telematics unit 114, it is possible for any combination of these VSMs 110 to be integrated within the telematics unit 114. Furthermore, the telematics unit 114 could include additional components not shown here, or could omit some of the components shown here.

Telematics Processor

The telematics processor 116 is implemented in any of various ways known to those skilled in the art such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices and/or modules (not shown) such as a real time clock device to provide accurate date and time information, and/or a timer module to track time intervals.

The processor 116 executes the one or more programs 124 stored in memory 122 to carry out various functions such as system monitoring, data processing, and communicating the telematics unit 114 with the VSMs 110, vehicle occupants, and remote locations. For example, the processor 116 can execute one or more control programs and processes programs and/or data to enable a method of voice dialing using a rejection reference, either alone or in conjunction with the call center 108. In another example, the processor 116 controls, generates, and accepts signals transmitted between the telematics unit 114 and call center 108, and between the telematics unit 114 and the vehicle communication bus 112 that is connected to the various VSMs 110. In one mode, these signals are used to activate programming and operation modes of the VSMs 110.

Telematics Memory

The telematics memory 122 can be any electronic storage device that provides computer-readable storage of data and programs for use by the processor 116. The memory 122 can include volatile, and/or non-volatile memory storage such as RAM, NVRAM, hard disks, flash memory, and/or the like, and can be implemented as one or more separate physical devices. The programs 124 include one or more computer programs that are executed as instructions by the processor 116 to carry out various functions of the telematics unit 114 such as messaging, diagnostics, communication, speech recognition, and/or the like. For example, the programs 124 resident in the memory 122 and executed by the processor 116 can be used to enable a method of voice dialing using a rejection reference. The database 126 can be used to store message data, diagnostic trouble code data or other diagnostic data, vehicle data upload (VDU) records, event activation tables, speech recognition data, and/or the like. The database 126 can be implemented as database tables that enable look-ups to be performed on data stored in the database 126, and this can be done using known indexing techniques, database queries, straight serial searching through such tables, and/or any other suitable storage and lookup techniques.

Telematics Communications Device

The telematics communications device 118 and associated antenna 120 transmits and receives voice and data to and from the wireless communication system 104 so that the telematics unit 114 can communicate with the call center 108 such as via the second communication system 106. The communications device 118 provides such wireless communication via cellular, satellite, and/or other wireless path, and can facilitate voice and data communication and data-over-voice communication, wherein both voice and data signals can be sent and received over a voice channel. Those skilled in the art will recognize that the communications device 118 can transmit and receive data over a voice channel by applying any suitable type of encoding or modulation to convert digital data for communication through a vocoder or speech codec incorporated in a cellular chipset. Any suitable encoding or modulation technique that provides an acceptable data rate and bit error rate can be used.

The communications device 118 can include any suitable modules including a satellite receiver and software, and/or cellular communications software and hardware such as a wireless modem and/or an embedded cellular telephone. The cellular telephone can be analog, digital, dual mode, dual band, multi-mode, and/or multi-band, and can include a separate processor and memory. Moreover, the cellular telephone can use any suitable cellular technology such as Advanced Mobile Phone System (AMPS), code division multiple access (CDMA), time division multiple access (TDMA), Global System for Mobile communications (GSM), or the like, but could also utilize proprietary or other wireless technologies to communicate with the wireless communication system 104. Although shown as a separate component, communications device 118, or portions thereof, can be implemented through software using microprocessor 116; for example, a modem used for wireless cellular communication can be implemented in this manner.

The communications device 118 can also include a global positioning system (GPS) module including communication and signal processing software and equipment, which can be separate from or integrated with the telematics device 114. For example, such a GPS module receives location and time data from the wireless communication system 104 and conveys corresponding latitude and longitude information to the telematics unit 114 to enable the telematics unit 114 to process, store, and send location information to carry out services such as navigation, driving directions, and emergency services.

The communications device 118 can further include a satellite communications module including signal processing software and equipment, which can be separate from or integrated with the telematics device 114. For example, the satellite communications module receives satellite radio broadcast signals over one or more channels from one or more geostationary satellites of a satellite service provider, and generates corresponding audio and/or data output. In addition to music and entertainment, traffic information, road construction information, advertisements, news and information on local events, satellite broadcasts may also include messages. Satellite radio broadcast signals received by the satellite communications module can be monitored for signals with targeted information, and when the targeted information is detected, the targeted message and associated information can be extracted from the broadcast signal.

Telematics User Interface

The telematics user interface 128 includes one or more input and output interfaces to receive input from, and transmit output to, telematics users. As used herein, the term user includes telematics service subscribers, vehicle occupants including drivers and passengers, and the like. Also, as used herein, the term user interface broadly means any suitable form of electronic device or adapter, or even a software module or adapter, which enables vehicle occupants to communicate with or control another piece of equipment. The user interface 128 can include individual components distributed throughout the vehicle, and/or can be integrated as a single unit such as a human/machine interface (HMI), infotainment center, or the like. Infotainment centers can receive and store downloads of content such as music, webpages, movies, television programs, videogames, or the like, for current or delayed playback.

The input interfaces can include one or more tactile devices 130, one or more microphones 132, or any other types of input technology. First, the tactile input device 130 enables vehicle occupants to activate one or more functions of the telematics unit 114, and can include one or more pushbutton switches, keypads, keyboards, or other suitable input devices located within the vehicle 102 in reach of the vehicle occupants. For example, the tactile input device 130 can be used to initiate telecommunications with remote locations such as the call center 108 or cellular telephones and/or to initiate vehicle updates, diagnostics, or the like. Second, the microphone 132 allows vehicle occupants to provide vocal input to the telematics unit 114, and enables vocal communication with various remote locations via the communications device 118. Vocal input from vehicle occupants can be interpreted using a suitable analog-to-digital interface and/or digital signal processor such as a sound card (not shown) between the microphone 132 and the processor 116, and voice and speech recognition programs and data stored within the memory 122.

The output interfaces can include one or more speakers 134, a visual display device such as a liquid crystal or plasma screen (not shown), or any other types of output technology. The speakers 134 enable the telematics unit 114 to communicate audible speech, signals, audio files, or the like to vehicle passengers, and can be part of a vehicle audio system or stand-alone components specifically dedicated for use with the telematics unit 114. A suitable interface such as a sound card (not shown) can be interposed between the speakers 134 and the telematics processor 116.

Communication System(s)

The communication systems 104, 106 can be implemented separately or can be combined as an integral system. Also, with suitable equipment, the call center 108, web server 109, and/or service center 111 can be wirelessly communicated directly to the wireless communication system 104 without the second system 106.

The wireless communication system 104 can include one or more analog and/or digital cellular networks 136, a wireless computer network such as a wide area network (WAN), wireless local area network (WLAN), broadband wireless area (BWA) network, and/or any other suitable wireless network used to transmit voice and/or data signals between the vehicle 102 and various remote locations such as the call center 108, web server 109, and/or service center 111. The cellular network 136 can be implemented as a CDMA, GSM, or other cellular communication network that enables exchange of voice and data between the vehicle 102 and the second communication system 106. The network 136 can include any suitable combination of cell towers, base stations, and/or mobile switching centers (MSC). For instance, a base station and cell tower could be co-located at the same site or they could be remotely located from one another, each base station could service a single cell tower or multiple cell towers, and various base stations could be coupled to a single MSC, to name but a few of the possible arrangements. A speech codec or vocoder can be incorporated in the system 104, such as in one or more of the base stations, but depending on the particular architecture of the wireless network, it could be incorporated within an MSC or some other network component as well.

The system 104 can also or alternatively carry out wireless communication by satellite transmission using one or more satellites 138 to communicate the vehicle 102 with the call center 108 via a ground-based satellite transceiver 140. As an exemplary implementation, the satellite transceiver 140 and satellite(s) 138 can transmit radio signals to the vehicle 102. For example, a satellite transmission can be broadcast over a spectrum in the "S" band that has been allocated by the U.S. Federal Communication Commission for national broadcasting of satellite-based Digital Audio Radio Service (DARS). More specifically, satellite transmission can be carried out using XMTM brand satellite radio services.

The second communication system 106 can be a land-based wired system such as a public switched telephone network (PTSN), Internet Protocol (IP) network, optical network, fiber network, cable network, and/or utility power transmission lines. The system 106 can also be another wireless communication system like system 104, WAN, WLAN, or a BWA network, or any combination of the aforementioned examples, any of which can be used or adapted for voice and/or data communication.

Call Center

The call center 108 provides services to the vehicle 102 by processing and storing data, and communicating with the vehicle 102. The call center 108 can provide back-end functions to the vehicle telematics unit 114 and can include one or more fixed or mobile data centers in one or more locations. The call center 108 can include advisors 142 to monitor various vehicle conditions, respond to service requests, and provide vehicle services such as remote vehicle assistance in connection with in-vehicle safety and security systems. The advisors 142 can be implemented as live human advisors, or as automatons or programs running on a computer operatively disposed to respond to user requests.

The call center 108 includes one or more voice and/or data interfaces 144 such as wired or wireless modems, switches such as private branch exchange (PBX) switches, and/or routers. The interface(s) 144 transmit and receive voice and/or data signals, such as by vehicle data uploads (VDUs), between the vehicle telematics unit 114 and the call center 108 through one or both of the communications systems 104, 106. For data-over-voice communication, the interface(s) 144 preferably apply some type of encoding or modulation to convert digital data for communication with a vocoder or speech codec.

The call center 108 further includes one or more communication service managers 146, one or more servers 148 to process data, one or more suitable databases 150 to store user data and any other suitable data, and one or more wired and/or wireless networks 152 such as a LAN or WLAN, for connecting the call center components together along with the any computer(s) used by the one or more advisors 142. For example, the servers 148 and databases 150 execute and store one or more control programs and data to enable a method of voice dialing using a rejection reference, either alone or in conjunction with the telematics unit 114 of the vehicle 102. In other words, the presently disclosed method can be enabled by the telematics unit 114 of the vehicle 102, by the computing equipment and/or personnel in the call center 108, or by any combination thereof.

Web Server

The integration of the web server 109 with the system 100 enables vehicle occupants to interact with websites and other content from the Internet, for example, by using automatic speech recognition technology and text-to-voice technology such as VoiceXML, or the like. For example, vehicle occupants can use the telematics unit 114 and embedded speech recognition to ask for information such as by vocalizing a command like "weather" or by speaking a nametag associated with a particular website address. The speech recognition technology recognizes the command or nametag and translates the request into suitable web language such as XML (Extensible Markup Language), and/or associates the request with a stored user profile to correlate the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupants via the user interface 128.

The web server 109 is implemented using one or more computer servers in any suitable location(s) such as at the call center 108 or an independent remote location. The exemplary web server 109 includes a suitable communication interface 154 such as a modem, switch, and/or router, a computer 156, and a database 158 all connected by any suitable network 160 such as an Ethernet LAN. The database 158 can be implemented using a separate network attached storage (NAS) device or can be stored on the computer 156 itself, or can be located elsewhere, as desired. The computer 156 has a server application program that controls the exchange of data between the vehicle 102 and the database 158. The web server 109 also communicates with the call center 108 and/or the service center 111 such as via the second communication system 106 or a more direct path. Suitable server hardware and software configurations are known to those skilled in the art.

Service Center

The service center 111 can be a vehicle service center where vehicle diagnosis, maintenance, and repair can be carried out. The service center 111 can be a vehicle dealership, automotive repair shop, or the like. The service center 111 is in communication with the vehicle 102 such as via the communication system so that vehicle occupants can, for example, initiate a telephone call with a sales or service representative at the service center 111.

Exemplary ASR System

In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

Figure 2:
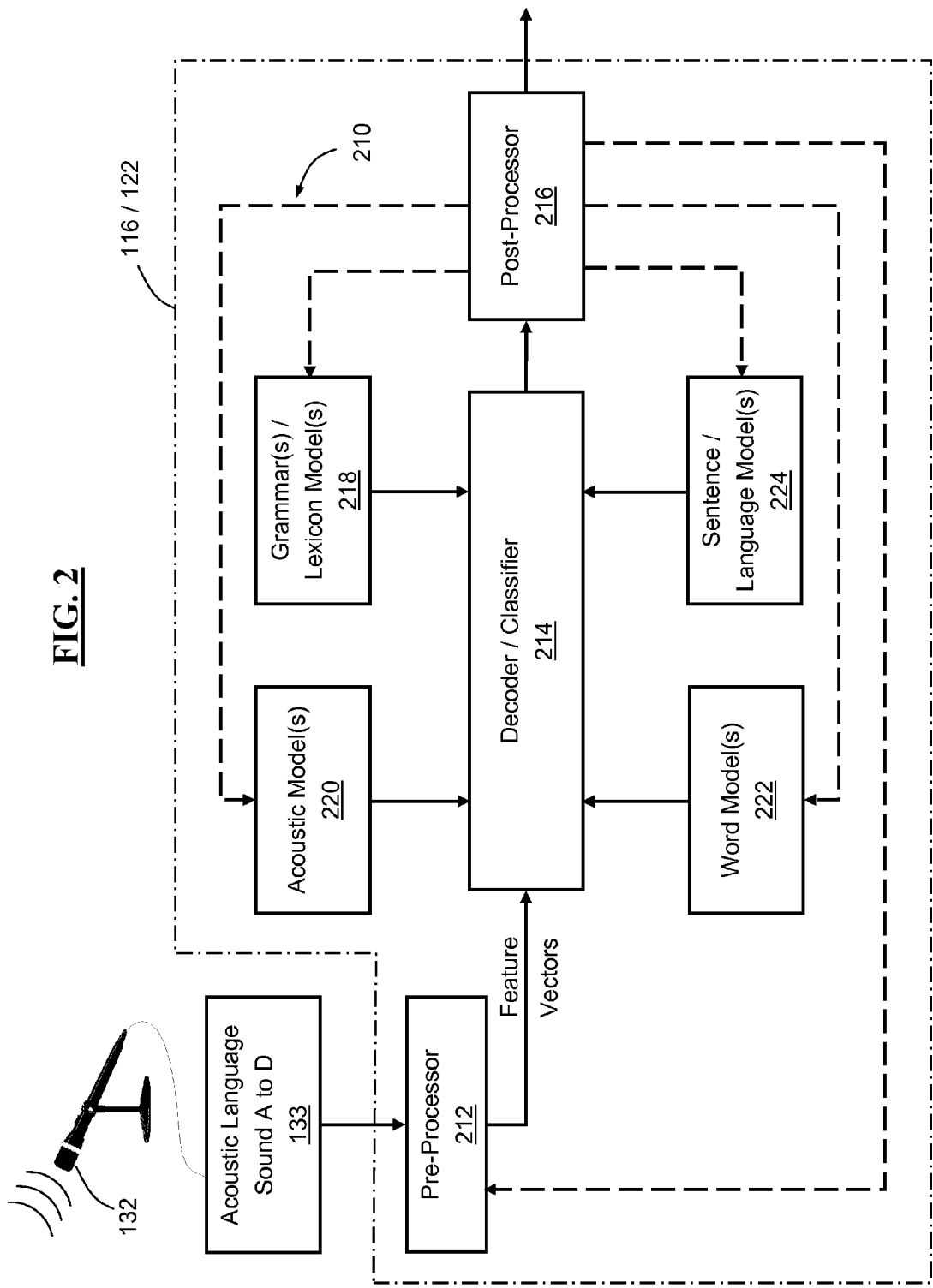
FIG. 2 is a block diagram illustrating an example ASR architecture that can be embedded within the telematics system of FIG. 1 and used to implement exemplary methods of voice dialing.

ASR systems are generally known to those skilled in the art, and FIG. 2 illustrates a specific exemplary architecture for an ASR system 210 that can be used to enable the presently disclosed method. The system 210 includes a device to receive speech such as the telematics microphone 132, and an acoustic interface 133 such as a sound card of the telematics user interface 128 to digitize the speech into acoustic data. The system 210 also includes a memory such as the telematics memory 122 for storing the acoustic data and storing speech recognition software and databases, and a processor such as the telematics processor 116 to process the acoustic data. The processor functions with the memory and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

One or more modules or models can be used as input to the decoder module 214. First, grammar or lexicon model(s) 218 can provide rules governing which words can logically follow other words to form valid sentences. In a broad sense, a grammar defines a universe of vocabulary the system 210 expects at any given time in any given ASR mode. For example, if the system 210 is in a training mode for training commands, then the grammar model(s) 218 can include all commands known to and used by the system 210. Second, acoustic model(s) 220 assist with selection of most likely subwords or words corresponding to input from the pre-processor module 212. Third, word model(s) 222 and sentence/language model(s) 224 provide syntax and/or semantics in placing the selected subwords or words into word or sentence context. Also, the sentence/language model(s) 224 can define a universe of sentences the system 210 expects at any given time in any given ASR mode, and/or can provide rules governing which sentences can logically follow other sentences to form valid extended speech.

According to an alternative exemplary embodiment, some or all of the ASR system 210 can be resident on, and processed using, computing equipment in a location remote from the vehicle 102 such as the call center 108. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software can be processed using processors of one of the servers 148 in the call center 108. In other words, the ASR system 210 can be resident in the telematics system 114 or distributed across the call center 108 and the vehicle 102 in any desired manner.

Extracting Acoustic Data

First, acoustic data is extracted from human speech wherein a vehicle occupant speaks into the microphone 132, which converts the utterances into electrical signals and communicates such signals to the acoustic interface 133. A sound-responsive element in the microphone 132 captures the occupant's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 133 converts the analog signals into digital electronic signals. The digital data are binary bits which are buffered in the telematics memory 122 and then processed by the telematics processor 116 or can be processed as they are initially received by the processor 116 in real-time.

Pre-Processing

Second, the pre-processor module 212 transforms the continuous stream of digital speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Decoding

Third, the processor executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem. A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Post-Processing

Finally, the post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212, or the like.

Methods of Voice Dialing

Methods of ASR-enabled voice dialing are provided herein and can be carried out as one or more computer programs using the architecture of the ASR system 210 within the operating environment of the telematics system 100 described above. Those skilled in the art will also recognize that the method can be carried out using other ASR systems within other operating environments.

In general, the methods are provided to improve performance of voice dialing speech recognition by keeping track of incorrectly recognized utterances via a rejection reference. The rejection reference can be a rejection list, table, matrix, or any other suitable tracking device that can be populated with digits or digit strings that have been determined to be incorrect during dialing of a given telephone number. The rejection reference can be cross-referenced against decoder recognition results to eliminate or reject incorrect recognition results from consideration and communication to a user. Accordingly, more accurate recognition results can be provided to the user to improve user satisfaction with voice dialing.

FIG. 3 illustrates a first exemplary method 300 of voice dialing a telephone number including a plurality of digits. Each individual step of the method can be carried out in any suitable manner, such as using respective portions of the ASR system 210 described above. As an initial matter, a user can place the ASR-enabled telematics system 114 into a voice dialing mode in any suitable manner, such as by uttering an appropriate command word like "DIAL" or the like.

In step 305, at least one utterance is received from a user. As used herein, the term utterance can include an utterance representative of a digit string. As also used herein, the phrase digit string can include one or more digits of a telephone number to be dialed. The digit string can be represented by a digit utterance such as "THREE" ("3") or "THREE-ONE-THREE" ("3-1-3"), or a number utterance "THREE HUNDRED THIRTEEN" ("313"), or any combination thereof such as "THREE-THIRTEEN" ("3-13"). A digit string can include a single digit or the entire telephone number to be dialed. In one example, the utterance can be received by the microphone 132 and then supplied via converter 133 to processor 116 and/or memory 122 of the ASR system 210.

In step 310, one or more recognition results are determined for the utterance. This can be done by decoding the utterance to identify the one or more recognition results. For example, a decoder such as the decoder 214 of the ASR system 210 can be used to decode the utterance to produce N-best recognition results. More specifically, the user's utterance from step 305 can be decoded to produce an N-best list of recognition results including THREE-ONE-TWO, THREE-ONE-FOUR, THREE-ONE-THREE, etc. Those skilled in the art will recognize that any suitable device(s) or module(s) can be used to convert the recognition results into corresponding digit results such as 312, 314, 313, etc. For example, this can be done using the post-processor 216 of the ASR system 210.

In step 315, a recognition result is communicated to a user. For example, the first best recognition result from the N-best list of recognition results of step 310 can be accepted and presented to the user by the ASR-enabled telematics system

114. In this example, THREE-ONE-TWO or 312 is communicated to the user. The recognition result(s) can be communicated audibly and/or visually such as through any suitable output device, such as the telematics user interface 128. The recognition result(s) can also be stored as a digit string(s) to be dialed such as by the telematics unit 114 at an appropriate time, and can be stored in any appropriate memory location, such as any suitable portion(s) of the telematics memory 122.

In step 320, the user is queried or given an opportunity to indicate whether the recognition result is incorrect. Thus, the system may receive an indication from the user that a communicated recognition result is incorrect. For example, in response to receiving the misrecognized digit string, or incorrect recognition result "312" from the preceding step, the user can say a correction command like "CORRECTION" or "CLEAR LAST ENTRY" or any other suitable command. The indication can be received, for example, by the microphone 132 and then be processed by the ASR system 210.

In step 325, a rejection reference is populated with the incorrect recognition result. The rejection reference can be a computer readable file, or a portion of a file, stored in any suitable volatile and/or non-volatile memory such as the telematics memory 122. Also or instead, the rejection reference can be data temporarily stored in a portion of volatile memory corresponding to any suitable memory address location(s). In any case, the rejection reference can be recalled by a processor from a memory location and/or generated by a processor using a program or routine stored in memory or the like. The incorrect recognition result can be added to the rejection reference by, for example, storing the misunderstood utterance along with the incorrect recognition result so that, wherever the system receives the same or similar utterance, it can use the rejection reference to rule out the incorrect recognition result as a potential ASR result. Alternatively, the incorrect recognition result can be stored without the associated utterance and simply used on a temporary basis to rule out the incorrect recognition result when the user is asked to repeat the misunderstood utterance. Using this alternative, temporary approach, once the correct recognition result is found the incorrect recognition results(s) can be deleted from the rejection reference. Also, the digit string corresponding to the incorrect recognition result can be cleared from where it was previously stored in memory in step 315.

In step 330, a user can be prompted to replace an incorrect recognition result. For example, the ASR-enabled telematics system 114 can output an audible and/or visual communication such as "OK, let's try again" or any other suitable statement(s) to prompt the user to replace the incorrect recognition result. The prompt can include an audio, video, and/or text computer file(s), which can be stored in any suitable memory such as the telematics memory 122 and executed by any suitable processor such as the telematics processor 116.

In step 335, a correction utterance to replace an incorrect recognition result can be received from a user. For example, the user can repeat the user's original utterance, from step 305, such as "THREE-ONE-THREE". The utterance can be received by the microphone 132 and then be supplied via converter 133 to processor 116 and/or memory 122 of the ASR system 210.

In step 340, ASR system 210 determines one or more corrected recognitions results for the corrected utterance. This can be done by decoding the corrected utterance to identify the one or more corrected recognition results. For example, the decoder 214 can be used to decode a correction utterance to produce N-best corrected recognition results. More specifically, the user's correction utterance from step 335 can be decoded as an N-best list of corrected recognition results including THREE-ONE-TWO, THREE-ONE-FOUR, THREE-ONE-THREE, etc. Those skilled in the art will recognize that the N-best list of recognition results may or may not be the same as the previously identified N-best list of recognition results from step 310. In other words, the present decoding step may yield an N-best list that is unique; based on current ambient noise levels, updated or different grammars, or the like.

In step 345, the one or more corrected recognition results can be compared to the rejection reference in any suitable manner. For example, the N-best corrected recognition results from step 340 can be cross-referenced against the data in the rejection reference to identify common digit strings. The presence in the recognition result(s) of a digit or digit string present in the rejection reference will preclude communication of that recognition result(s) to the user in the next step. In other words, the rejection reference can be used to reject one or more recognition results. In the specific example given, the presence in the rejection reference of the digit string "312" from step 325 will preclude use of and communication of that previously misrecognized digit string in the N-best list of recognition results.

In step 350, a corrected recognition result that is not precluded by a rejection reference is returned by the system and can then be communicated to the user. For example, because the first best recognition result, "312," from the N-best list of recognition results produced in step 340 is precluded by the rejection reference per step 345, the next or second best recognition result, "314," can be communicated to the user. The corrected recognition result(s) can also be stored as a digit string(s) to be dialed in any appropriate memory location, such as any suitable portion(s) of the telematics memory 122.

In step 355, the user is again queried or given an opportunity to indicate that the now corrected recognition result is still incorrect. For example, in response to receiving the incorrect corrected recognition result "314," from the preceding step, the user can say "CORRECTION" or "CLEAR LAST ENTRY" or any other suitable command. As with all other user verbal input, the indication can be received by the microphone 132 and then proceed by the ASR system 210.

In step 360, the rejection reference can be populated with the incorrect corrected recognition result. For example, the rejection reference from step 325 can be populated with the corrected recognition result "314" that was indicated as incorrect in step 355. Also, the digit string corresponding to the incorrect corrected recognition result can be cleared from where it was previously stored in memory in step 350.

In step 365, a user can be prompted to replace the incorrect corrected recognition result. For example, the telematics system 114 can output an audible and/or visual communication such as "OK, let's try again" or any other suitable statement(s) to prompt the user to replace the corrected recognition result indicated as incorrect in step 355. The prompt can include an audio, video, and/or text computer file(s), which can stored in any suitable memory such as the telematics memory 122 and executed by any suitable processor such as the telematics processor 116.

In step 370, a subsequent correction utterance can be received from a user to replace an incorrect corrected recognition result. For example, the user can repeat the user's previous utterances, from steps 305 and 335, such as "THREE-ONE-THREE" to replace the incorrect digit string "314." In step 375, the subsequent correction utterance can be decoded to identify a recognition result for the subsequent correction utterance. For example, the decoder 214 can be used to decode the subsequent correction utterance from step 370 to identify a second N-best list of recognition results. In the example shown, the user's subsequent correction utterance from step 370 can be decoded as an N-best list including THREE-ONE-TWO, THREE-ONE-FOUR, THREE-ONE-THREE, etc. Those skilled in the art will recognize that the N-best list of recognition results may or may not be the same as the previously identified N-best list of recognition results from steps 340 and/or 310.

In step 380, one or more subsequent corrected recognition results can be compared to the rejection reference, like previously described with respect to step 345. For instance, the presence in the rejection reference of the digit string "312" from step 325 and of the digit string "314" from step 360 will preclude use and communication of the digit strings "312" and "314" in the N-best list of recognition results.

In step 385, a subsequent corrected recognition result that is not precluded by a rejection reference can be communicated to a user. For example, because the first and second best recognition results, "312" and "314," from the N-best list of recognition results of step 375 are effectively rejected by application of the rejection reference, the next or third best recognition result, "313,"can be communicated to the user in any suitable manner.

In step 390, the user can again reject the subsequent recognition result as discussed above. However, in this example, the subsequent recognition result is correct and the user therefore accepts the recognition result by uttering another digit or digit string. For example, the user can accept the corrected recognition result from step 385 by uttering one or more subsequent digit string(s) such as "667."

FIG. 4 illustrates a second exemplary method 400 of voice dialing a telephone number including a plurality of digits. This embodiment is similar in many respects to the embodiment of FIG. 3 and like steps between the embodiments generally designate like or corresponding steps throughout the drawing figures. Additionally, the descriptions of the FIGS. 3 and 4 embodiments are incorporated by reference into one another and the common subject matter may generally not be repeated.

In step 405, a plurality of utterances is received from a user. For example, a user's utterance "313" can be received before the user pauses and then a subsequent utterance "667" can be received after the user pauses. The utterances can be spoken and received before the ASR system can respond.

Multiple utterances can be defined between pauses. In other words, a complete telephone number can include a plurality of utterances representative of digit strings, wherein pauses between the utterances define the end of one utterance and a beginning of a subsequent utterance. Any suitable timer module can measure time intervals in the form of time that has expired since a most recent utterance was received. Such time intervals can be initialized, monitored, and reset by any suitable device such as the telematics processor 116. Those skilled in the art will recognize that such a device can be used to initialize, populate, and clear suitable memory locations, such as sequential memory locations, for receiving the utterances.

In step 410, a plurality of utterances is decoded to identify recognition results for the plurality of utterances. For example, the decoder 214 can be used to decode the utterances to produce a set of N-best recognition results for each of the plurality of utterances. More particularly, an exemplary N-best list of recognition results for the utterance "313" can include 312, 313, . . . through an Nth best result, N, and an exemplary N-best list of recognition results for the utterance "667" can include 667, 767, 677, . . . through another Nth best result, N. Further, before any recognition result is communicated to the user, the recognition result and/or the N-best list(s) from which it was generated can be compared to a rejection reference in any suitable manner to identify common digit strings and eliminate them from consideration and communication to the user.

In step 415, at least one recognition result is communicated to a user. For example, the first best recognition results from each of the N-best lists of recognition results for the plurality of utterances from step 410 can be returned to the user. Also, the recognition result(s) can be stored in memory, for example as sequential digit string(s) to be dialed. Those skilled in the art will recognize that any suitable device, such as the telematics processor 116, can be used to initialize, populate, and clear suitable memory locations, such as sequential memory locations, for receiving the recognition result(s).

In step 420, an indication is received from a user that one or more communicated recognition results is incorrect. For example, the first "Correction" in FIG. 4 can indicate that one or both of the recognized result "312" or the recognized result "667" is incorrect.

In step 425, a multiple position rejection reference is populated with a most recently communicated recognition result. For example, the rejection reference can comprise multiple digit string positions corresponding to discrete utterances of a sequence of utterances. More particularly, the rejection reference can include a first position corresponding to a first digit string, and a second position corresponding to a second digit string, and so on. In any case, in response to the user's correction command, the rejection reference is populated with the most recently communicated recognition result, which is "667" in the example above. Also, the digit string "667" can be cleared from memory. Finally, one or more asterisks indicate "wildcard(s)" in digit positions where the digits have been accepted or have not yet been input.

In step 430, a user can be prompted to replace an incorrect recognition result. For example, a recognition result that immediately precedes a most recently communicated recognition result can be communicated to a user. For example, the recognition result "312," which immediately precedes the most recently communicated recognition result, "667," is communicated to the user. In effect, this tells the user that a dial memory location has been cleared of the "667" digit string and currently includes only the "312" digit string and, thus, prompts the user to either indicate a correction to the "312" digit string or to utter a subsequent digit string intended to follow "312."

In step 435, an indication can be received from a user that a recognition result is incorrect. For example, the second "Correction" command in FIG. 4 indicates that the recognized digit string "312" is incorrect. In step 440, the rejection reference can be populated with the incorrect recognition result. For example, the recognition result "312" indicated as incorrect in step 435 is added to its corresponding position in the rejection reference. Also, the communicated recognition result of step 425 is cleared from the rejection reference as shown in strikethrough in FIG. 4. In effect, this allows the user to back up and skip over the correct result 667 to correct a preceding incorrectly recognized digit string utterance.

In step 445, the user can be prompted to replace the incorrect recognition result. For example, the user can be prompted to replace the recognition result indicated as incorrect from step 435, e.g. "312." The prompt can include "OK, let's try again" or any other suitable statement(s) or communication. In step 450, a correction utterance is received from the user to replace the incorrect recognition result. For example, a user's correction utterance "313" can be received.

In step 455, the correction utterance is used to determine one or more corrected recognition results; again, by decoding the correction utterance to identify at least one corrected recognition result for the correction utterance. For example, the correction utterance from step 450 can be decoded to produce an N-best list of recognition results.

In step 460, the one or more corrected recognition results can be compared to the rejection reference in any suitable manner. For example, the N-best list of recognition results from step 455 can be cross-referenced against the rejection reference to identify common digit strings and eliminate them from consideration and communication to the user.

In step 465, a corrected recognition result that is not precluded by the rejection reference can be communicated to the user. For example, one of the corrected recognition results from step 460 can be communicated to the user. More particularly, because the first best recognition result "312" from the N-best list of recognition results of step 460 is precluded by the rejection reference, the next or second best recognition result "313" can be communicated to the user in any suitable manner.

In step 470, a user can accept a recognition result by uttering another digit or digit string. For example, the user can accept the corrected recognition result from step 465, by uttering one or more subsequent digit string(s) such as 667.

In step 475, an utterance for a second digit string can be decoded to identify at least one recognition result for the utterance. For example, the decoder can produce an N-best list of recognition results for the utterance "667" including 667, 767, . . . through an Nth best result, N.

In step 480, the recognition result can be compared to the rejection reference in any suitable manner. For example, the recognition result from step 475 can be compared to the rejection reference, which was revised in step 440.

In step 485, a recognition result that is not precluded by the rejection reference can be communicated to the user. For example, a recognition result from step 480 can be communicated to the user. Because the digit string "667" was cleared from the rejection reference, the first best result "667" from the N-best results can be returned.

FIGS. 5A and 5B illustrate a third exemplary method 500 of voice dialing a telephone number including a plurality of digits. This embodiment is similar in many respect to the embodiments of FIGS. 3 and 4 and like steps between the embodiments generally designate like or corresponding steps throughout the drawing figures. Additionally, the descriptions of the various embodiments are incorporated by reference into one another and the common subject matter may generally not be repeated.

In step 505, at least one utterance representative of at least one digit is received from a user. For example, a first digit string can be received from the user including one or more digits, such as "313," before a user pause, and then a subsequent utterance, such as "555," can be received after the user pause. In this example, the two sequential digit strings are uttered faster than the system can process and respond to the first utterance.

In step 510, at least one utterance representative of at least one digit is decoded to identify recognition results for the utterance(s). For example, the first and second digit string utterances "313" and "555" can be decoded to produce lists of N-best recognition results for each. Further, before any recognition result is communicated to the user, the recognition result and/or the N-best list(s) from which it was generated can be compared to a rejection reference in any suitable manner to identify common digit strings and eliminate them from consideration and communication to the user.

In step 515, a recognition result for the utterance representative of at least one digit is communicated to a user. For example, the first best recognition results from each of the N-best lists of recognition results from step 510 can be communicated to the user. Also, the recognition result(s) can be stored in memory, for example as sequential digit string(s) to be dialed.

In step 520, the user may provide to the ASR system an indication that a communicated recognition result is incorrect. For example, an indication is received from the user that one or more of the communicated recognition results from step 515 is incorrect. For example, the first "Correction" command in FIGS. 5A and 5B can indicate that the recognized result "318" is incorrect and/or the recognized result "559" is incorrect.

In step 525, a multiple-digit-position rejection reference is populated with a most recently communicated recognition result. For example, the rejection reference can include a matrix having one or more rows corresponding to one or more misrecognized utterances and a plurality of columns of digit positions corresponding to discrete digits of the misrecognized utterances. The number of columns can correspond to the number of digits in a given telephone number to be dialed. The number of rows can correspond to the number of misrecognized utterances incurred during a session of dialing the given telephone number. In other words, the size of the rejection reference can be variable. For example, the rejection reference can be 10×3 for a 10 digit telephone number that is being attempted to dial and that was misrecognized three times before finally being dialed.

Moreover, the multi-digit-position rejection reference can include a first digit position corresponding to a first digit, which begins a digit string utterance, such as "3" in "318," and a sixth digit position corresponding to a sixth digit at the end of a second utterance string, such "9" in "559," and so on. In any case, the rejection reference is populated with the most recently communicated recognition result, which is "559" in the example above. Each digit of the incorrect recognition result is added to corresponding digit positions of the plurality of digit positions of the rejection reference. Accordingly, digit positions 4, 5, 6 are populated with recognized digits 5, 5, 9 respectively.

In step 530, a user can be prompted to replace an incorrect recognition result. For example, a recognition result that immediately precedes a most recently communicated recognition result can be communicated to a user. For example, the recognition result "318," which immediately precedes the most recently communicated recognition result, "559," is communicated to the user. In effect, this tells the user that a dial memory location has been cleared of the "559" digit string and currently includes only the "318" digit string and, thus, prompts the user to either indicate a correction to the "318" digit string or to utter a subsequent digit string intended follow "318."

In step 535, a correction utterance can be received from the user to replace the incorrect recognition result. For example, the user's correction utterance including the second digit string "555" can again be received from the user to replace the incorrect recognition "559." As the example in FIG. 5A shows, the user chooses to correct the "559" digit string because the user does not yet realize that the "318" recognition result is incorrect. In step 540, the correction utterance can be decoded to identify corrected recognition results for the correction utterance. For example, the correction utterance from step 535 can be decoded to produce an N-best list of corrected recognition results.

In step 545, each recognized digit of a corrected recognition result can be compared to respective positions of a plurality of digit positions of the rejection reference. For example, each recognized digit of each N-best recognition result from step 540 can be cross-referenced against each digit position of the rejection reference to identify common digits of a digit string and eliminate the digit string from consideration and communication to the user. For example, the digit string 559 is rejected.

In step 550, a corrected recognition result that is not precluded by the rejection reference can be communicated to the user. For example, one of the corrected recognition results from step 540 can be communicated to the user. More particularly, because the first best recognition result "559" from the N-best list of recognition results of step 540 is precluded by the rejection reference, the next or second best recognition result, "555," can be communicated to the user in any suitable manner. Also, the corrected recognition result can be stored in memory, for example as sequential digit string to be dialed.

Referring to FIG. 5B, in step 555, a correction utterance can be received from a user to replace an incorrect recognition result. For example, the user can realize that a first digit string utterance was misrecognized and, thus, a user's correction utterance "Correction" or the like can be received.

In step 560, a rejection reference is populated with a most recently communicated recognition result. For example, the rejection reference can be populated with the most recently communicated recognition result, which is 555 in the example above. Accordingly, digit positions 4, 5, 6 are populated with recognized digits 5, 5, 5 respectively.

In step 565, a user can be prompted to replace an incorrect recognition result. For example, a recognition result that immediately precedes a most recently communicated recognition result can be communicated to a user. More particularly, the recognition result "318," which immediately precedes the most recently communicated recognition result, "555," is communicated to the user. In effect, this tells the user that a dial memory location has been cleared of the "555" digit string and currently includes only the "318" digit string and, thus, prompts the user to either indicate a correction to the "318" digit string or to utter a subsequent digit string intended follow "318."

In step 570, a correction utterance can be received from the user to replace the incorrect recognition result. For example, the user can correct the first digit string utterance wherein the user's correction utterance "Correction" or the like can be received. As the example in FIG. 5B shows, the user can choose to correct the "318" digit string because the user just realized that the "318" recognition result is incorrect.

In step 575, the rejection reference is populated with a most recently communicated recognition result. For example, the rejection reference can be populated with the most recently communicated recognition result, which is "318" in the example above. Accordingly, digit positions 1, 2, 3 are populated with recognized digits 3, 1, 8 respectively. Also, the first digit string corresponding to the recognition result can be cleared from where it was previously stored in memory in step 515. Further, each digit of the communicated recognition result of step 550 is cleared from the rejection reference as shown in strikethrough in FIG. 5B.

In step 580, a user can be prompted to replace an incorrect recognition result. For example, the user can be prompted to replace the recognition result indicated as incorrect from step 570, e.g. "318." The prompt can include "OK, let's try again" or any other suitable statement(s) or communication.

In step 585, at least one utterance representative of at least one digit is received from a user. For example, the user can change the digit string length, and utter a new longer length first digit string. For instance, the new first string can cover six digit positions including 1, 2, 3, 4, 5, 6, which were previously covered by two digit strings; namely the exemplary first and second digit strings from step 505.

In step 590, at least one utterance representative of at least one digit is decoded to identify recognition results for the at least one utterance. For example, the new first digit string 313555 can be decoded to identify a list of N-best recognition results including 313555, 313559, . . . N. Further, before any recognition result is communicated to the user, the recognition result and/or the N-best list(s) from which it was generated can be compared to the rejection reference in any suitable manner to identify common digit strings and eliminate them from consideration and communication to the user.

In step 595, the recognition result for the utterance is communicated to a user. For example, the first best recognition result from the N-best list of recognition results from step 590 can be communicated to the user. Also, the recognition result can be stored in memory, for example as a first digit string to be dialed. In step 600, the user can accept the recognition result by uttering another digit or digit string. For example, the user can accept the corrected recognition result from step 595, by uttering one or more subsequent digit string(s) such as 5594.

In step 605, an utterance for a second digit string can be decoded to identify at least one recognition result for the utterance. For example, the decoder can identify an N-best list of recognition results for the utterance "5594" including 5594, 5554, . . . N. Further, before any recognition result is communicated to the user, the recognition result and/or the N-best list(s) from which it was generated can be compared to a rejection reference using any of the approaches discussed above to identify common digit strings and eliminate them from consideration and communication to the user.

In step 610, a recognition result for an utterance representative of at least one digit is communicated to a user. For example, the first best recognition result from the N-best list of recognition results from step 605 can be communicated to the user. Also, the recognition result can be stored in memory, for example as a second or last digit string to be dialed. User correction of this recognition result can proceed, if necessary, as discussed above, until the correct result is determined.

Finally, the ASR grammar 218 can be dynamically modified to improve voice dialing accuracy. For example, an initial grammar can be used for a telephone number of a given expected length, and then modified as digits of the telephone number are recognized. In a more particular example, an initial grammar for a ten digit telephone number can be applied when first recognizing any given ten digit telephone number. For a first utterance corresponding to a first digit string to be recognized, such as "313," the initial ten digit grammar is applied during decoding of the first utterance. Then, the initial ten digit grammar can be modified based on the quantity of digits just recognized.

For instance, because the first utterance represents three of the ten digits, the initial ten digit grammar can be pared down to a seven digit grammar. This modification effectively eliminates all ten, nine, and eight digit number grammar possibilities. Thus, for example, when recognizing a subsequent utterance for a subsequent digit string, the seven digit grammar is applied. The seven digit grammar would include all possible combinations for single digit, two digit, three digit, four digit, five digit, six digit, and seven digit numbers. Then, for example, if three more digits are recognized in the subsequent digit string, a four digit grammar would be applied, and so on. Accordingly, after an initial digit string utterance, the entire universe of possible remaining numbers is gradually reduced during recognition of the telephone number. This effectively increases the possibility of correctly recognizing subsequent utterances representative of subsequent digit strings.

It is to be understood that the foregoing description is not a definition of the invention, but is a description of one or more preferred exemplary embodiments of the invention. The invention is not limited to the particular embodiments disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiments will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A voice dialing method, comprising the steps of:
   (a) receiving a first utterance followed by a subsequent utterance from a user via a microphone associated with an automatic speech recognition system;
   (b) determining a first recognition result for the first utterance and a subsequent recognition result for the subsequent utterance using a processor associated with the automatic speech recognition system;
   (c) communicating the recognition results to the user via an output device associated with the automatic speech recognition system;
   (d) receiving from the user a first indication that at least one of the recognition results is incorrect;
   (e) populating a rejection reference in memory associated with the automatic speech recognition system with the subsequent recognition result after receiving the first indication;
   (f) receiving from the user a second indication that at least one of the recognition results is incorrect after receiving the first indication;
   (g) clearing the subsequent recognition result from the rejection reference and populating the rejection reference with the first recognition result after receiving the second indication;
   (h) receiving a correction utterance from the user; and then
   (i) processing the correction utterance based on the first recognition result being in the rejection reference.

2. The method of claim 1, wherein step (i) includes the steps of:
   (j) determining one or more recognition hypotheses for the correction utterance;
   (k) comparing the one or more recognition hypotheses to the rejection reference; and
   (l) communicating to the user a corrected recognition result from the one or more recognition hypotheses that is not precluded by the rejection reference.

3. The method of claim 2, further comprising:
   (m) receiving from the user an indication that the corrected recognition result is incorrect;
   (n) populating the rejection reference with the incorrect corrected recognition result;
   (o) prompting the user to replace the incorrect corrected recognition result;
   (p) receiving a subsequent correction utterance from the user to replace the incorrect corrected recognition result;
   (q) determining one or more subsequent recognition hypotheses for the subsequent correction utterance;
   (r) comparing the one or more subsequent recognition hypotheses to the rejection reference; and
   (s) communicating to the user a subsequent corrected recognition result from the one or more subsequent recognition hypotheses that is not precluded by the rejection reference.

4. The method of claim 1, wherein the rejection reference of the populating step (e) includes multiple positions, wherein each position corresponds to one of the utterances.

5. The method of claim 4, wherein the utterances are separated by one or more user pauses.

6. The method of claim 4, wherein the utterances represent digit strings.

7. The method of claim 6, wherein each of the digit strings comprise at least one digit.

8. The method of claim 1, wherein the rejection reference of the populating step (e) includes multiple digit positions, wherein the digit positions correspond to respective recognized digits in the utterances.

9. The method of claim 1, wherein the determining step (b) includes producing N-best recognition hypotheses and identifying the recognition result for the one or more utterances from the N-best recognition hypotheses.

10. The method of claim 1, wherein the receiving step (d) includes receiving a correction command from the user.

* * * * *